(12) United States Patent
Robaina

(10) Patent No.: US 11,846,565 B2
(45) Date of Patent: Dec. 19, 2023

(54) AUTOMOBILE SUBFRAME ALIGNMENT FIXTURE

(71) Applicant: Roberto E. Robaina, Cerritos, CA (US)

(72) Inventor: Roberto E. Robaina, Cerritos, CA (US)

(73) Assignee: RDI (Robaina Design Innovations) LLC, Newport Beach, CA (US)

( * ) Notice: Subject to any disclaimer, the term of this patent is extended or adjusted under 35 U.S.C. 154(b) by 32 days.

(21) Appl. No.: 17/321,442

(22) Filed: May 15, 2021

(65) Prior Publication Data

US 2021/0356363 A1 Nov. 18, 2021

Related U.S. Application Data

(60) Provisional application No. 63/025,339, filed on May 15, 2020.

(51) Int. Cl.
*G01M 17/007* (2006.01)

(52) U.S. Cl.
CPC ................ *G01M 17/007* (2013.01)

(58) Field of Classification Search
CPC .... G01M 13/00; G01M 5/005; G01M 17/007; B23P 19/04; Y10T 29/49895; Y10T 29/49902; Y10T 29/49998; B25B 11/02; Y10S 269/90

See application file for complete search history.

(56) References Cited

U.S. PATENT DOCUMENTS

| | | | |
|---|---|---|---|
| 6,058,614 A * | 5/2000 | Shibayama | G01M 17/04 33/645 |
| 7,093,369 B2 | 8/2006 | Ohnesorge | |
| 7,878,287 B2 | 2/2011 | Buchwitz et al. | |
| 9,950,743 B2 | 4/2018 | Yokota | |
| 2008/0134490 A1* | 6/2008 | Buchwitz | B62D 65/12 280/124.109 |

FOREIGN PATENT DOCUMENTS

| | | | |
|---|---|---|---|
| WO | 9519868 A1 | 7/1995 | |
| WO | WO-9519868 A1 * | 7/1995 | ........... B23K 37/047 |

OTHER PUBLICATIONS

PCT/US2021/032648. International Search Report & Written Opinion (dated Aug. 17, 2021), 7 pages.

* cited by examiner

*Primary Examiner* — Eric S. McCall
*Assistant Examiner* — Timothy P Graves
(74) *Attorney, Agent, or Firm* — Heidi Eisenhut; LOZA & LOZA, LLP

(57) ABSTRACT

An adjustable automobile subframe alignment fixture for inspecting a subframe includes one or more bases; one or more rails, connected to the one or more bases, having indexing positions to accommodate multiple sized subframes; and one or more connection points, adjustably mounted on the one or more rails, configured to receive risers and/or jigs for adjusting to a geometry of the subframe and allowing structural integrity of the subframe to be determined. If the geometry of the subframe matches the geometry of the fixture, the subframe is structurally sound. If the geometry of the subframe fails matches the geometry of the fixture, the subframe lacks structural integrity.

5 Claims, 7 Drawing Sheets

AUTOMOBILE SUBFRAME ALIGNMENT FIXTURE

PRIORITY

This application claims priority to and the benefit of provisional patent application No. 63/025,339, filed in the United States Patent and Trademark Office on May 15, 2021, the entire content of which is incorporated herein by reference as if fully set forth below in its entirety and for all applicable purposes.

FIELD

Various embodiments of the invention pertain to automobile subframes and vehicle repair.

BACKGROUND

Modern automobiles are comprised of many parts and subassemblies. At the most basic level, automobiles have engines, tires, and an external body all connected to a sturdy frame. Often, a direct connection of these parts to the frame is not possible, thus, automotive designers utilize subframes to connect these components to the frame.

Subframes are secondary structural components designed to attach other critical components to the main frame. Engines, drivetrains, suspension and other critical components can be bolted securely to a subframe which in turn is fixed to the main frame of the vehicle, ensuring precision fit and function of the assembly.

Without proper maintenance, or due to poor driving habits or driving conditions, critical components can and will fail at unknown times. Even with proper maintenance and driving habits, the normal wear and tear of driving an automobile can cause components to fail unexpectedly due to fatigue. And while the best of maintained vehicles can travel hundreds of thousands of miles or more, chances are such a vehicle will require replacement parts from time to time.

In the event of an accident, a sudden and sharp transfer of energy to the vehicle beyond the design criteria, may occur. When an accident occurs, it must be determined if the vehicle is safe for continued use. More specifically, in today's world where most automobile drivers have auto insurance, a determination must be made as to whether or not the vehicle is worth fixing to ensure it is safe.

Based on visual and obvious damage to the vehicle, best judgment, and experience, insurance adjusters and repair technicians must estimate the total costs of repairing the vehicle. Insurance companies must then calculate the odds of more unseen damage and evaluate the costs that may be associated with this unknown. If this estimate and odds of potential unseen costs are likely to be more expensive than the value of the automobile, the insurance company is likely to write-off the car to sell it for parts and/or scrap, and simply pay off the policy owner. Older, inexpensive vehicles are often considered write-offs, even if the damage is repairable and even if the car is still drivable. However, for expensive vehicles it may be cheaper for the insurance companies to repair the damage. In this later instance, insurance companies would like to repair the damaged vehicle to a safe and aesthetically pleasing state for the least amount of money.

To do this, damaged body panels can be replaced or repaired by forming pieces back into place. Paint can be matched to meet the original colors and engines can be replaced or repaired as needed. Frames can even be inspected for damage using current repair benches and fixtures common to the automotive repair market and forced back into alignment if needed.

Importantly, if a subframe is damaged there is no repair procedure, it must be replaced. However, nothing currently exists that allows someone to inspect for damage to the front and rear subframes of the vehicle. Thus, due to the critical function of the subframe, if damage to this component is merely suspected, the subframe is simply replaced out of caution, even if no damage exists.

Unfortunately, it is also very possible that a replacement subframe may have come from another vehicle that was damaged in another area of the car and written-off. In this instance there is likely no traceability. Unseen damage to this replacement subframe, due to any number of issues, may exist. This unseen damage may include, but is not limited to, fatigue from poor driving habits or conditions, poor craftsmanship during manufacturing, or even a large energy transfer accident associated with this replacement subframe which has tweaked it outside of safe conditions but unnoticeable to the human eye. In this case, due to an abundance of caution at the repair shop, it is possible to replace a good subframe with a faulty one.

Thus, for the safety of the automobile owner and for potential reduction in cost of repairs, an inspection device for front and rear subframes is desirable for the automotive repair industry, especially for higher end automobiles most likely to be repaired in the event of minor collisions.

SUMMARY

The following presents a simplified summary of some aspects to provide a basic understanding of such aspects. This summary is not an extensive overview of all contemplated features of the disclosure and is intended neither to identify key or critical elements of all aspects nor to delineate the scope of any or all aspects. Its sole purpose is to present various concepts of some aspects in a simplified form as a prelude to the more detailed description that is presented later.

According to some aspects, an adjustable automobile subframe alignment fixture is provided. The adjustable automobile subframe alignment fixture includes one or more bases; one or more rails, connected to the one or more bases, having indexing positions to accommodate multiple sized subframes; and one or more connection points, adjustably mounted on the one or more rails, configured to receive risers and/or jigs for adjusting to a geometry of a subframe and allowing structural integrity of the subframe to be determined.

According to one feature, matching the geometry of the subframe to a geometry of the fixture and represents structural integrity of the subframe.

According to one feature, failing to match the geometry of the subframe to a geometry of the fixture represents lack of structural integrity of the subframe.

According to one feature, the one or more connection points is a threaded hole pattern.

According to one feature, the risers and/or jigs are unique to individual subframes.

According to some aspects, an automobile subframe alignment fixture for inspecting a subframe is provided. The automobile subframe alignment fixture includes a lower surface; one or more columns extending outwardly from the lower surface; and one or more material voids located within the lower surface; where the lower surface, the one or more columns and the one or more material voids form a fixture geometry; and where matching the fixture geometry to a geometry of a subframe represents structural integrity of the subframe.

According to one feature, the fixture further comprises one or more apertures located within the lower surface, the one or more columns, and/or the one or more material voids; where when the one or more apertures directly line up with subframe apertures on the subframe, a continuous aperture is formed between the fixture and the subframe representing structural integrity of the subframe.

According to one feature, wherein a pin passing through the one or more apertures in the fixture and the one or more apertures in the subframe represents that fixture is properly aligned with the subframe.

According to one feature, wherein angles are formed into the one or more columns allowing the subframe to be lowered onto the fixture and avoid interference.

According to one feature, wherein the fixture is unique to an individual subframe representing a specific automobile.

The novel characteristic features of this invention are set forth in the appended claims. The detail description of invention along with mode of operation and its organization, advantages and additional objects are presented here, along with applicable drawings, for better understanding. Descriptions of specific embodiments are best understood when read in connection with these drawings.

BRIEF DESCRIPTION OF DRAWINGS

Various features, nature and advantages may become apparent from the detailed description set forth below when taken in conjunction with the drawings in which like reference characters identify correspondingly throughout.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail, so as not to unnecessarily obscure aspects of the invention.

The following descriptions refer to vehicle subframes, however this invention may apply to other components within the automotive industry, or any other industry where measuring a structure or subframe is critical and/or difficult.

According to embodiments of the present invention, a fixture designed to check for the accurate alignment of an automotive subframe may include a base comprised of a shell and internal frame, depending on the embodiment, of specific geometry of a subframe, provided with pins. This fixture features novel designs, in geometry and functionality, as described herein.

In one aspect of the present invention, a fixture capable of holding a vehicle specific front or rear subframe in place when removed from the automobile is provided.

In another aspect of the present invention, each fixture will contain geometry that allows for fixture material to nearly touch the specific subframe at important subframe features and points, including but not limited to threaded connection points, bushings, and apertures for connecting to other components in practice.

In yet another aspect of the present invention, a series of apertures within the fixture designed to specifically align with subframe threaded connection points, bushings, and apertures is provided.

In yet another aspect of the present invention, pins are provided to slide within the provided apertures of the fixture and mate with properly aligned subframe threaded connection points, bushings, and apertures.

In yet another aspect of the present invention, pins that slide within the provided apertures of the fixtures, but do not fit within the expected subframe feature show the subframe to be out of alignment in that area, such that adjustments are required or a new subframe must be used.

In yet another aspect of the present invention, a fixture design that may comprise a 3D or additive printed external shell for weight savings, fitted to a metallic skeleton for strength is provided.

In yet another aspect of the present invention, a simplified fixture design comprising only of the metallic skeleton is provided.

In yet another aspect of the present invention, the fixture may comprise a simple flat base with attachment points for connecting risers and jigs with the appropriate geometry to mate with the subframe.

In yet another aspect of the present invention, the fixture provides mounting points such that the invention can be securely fixed to a workbench.

Fixture Design

Figure 1:
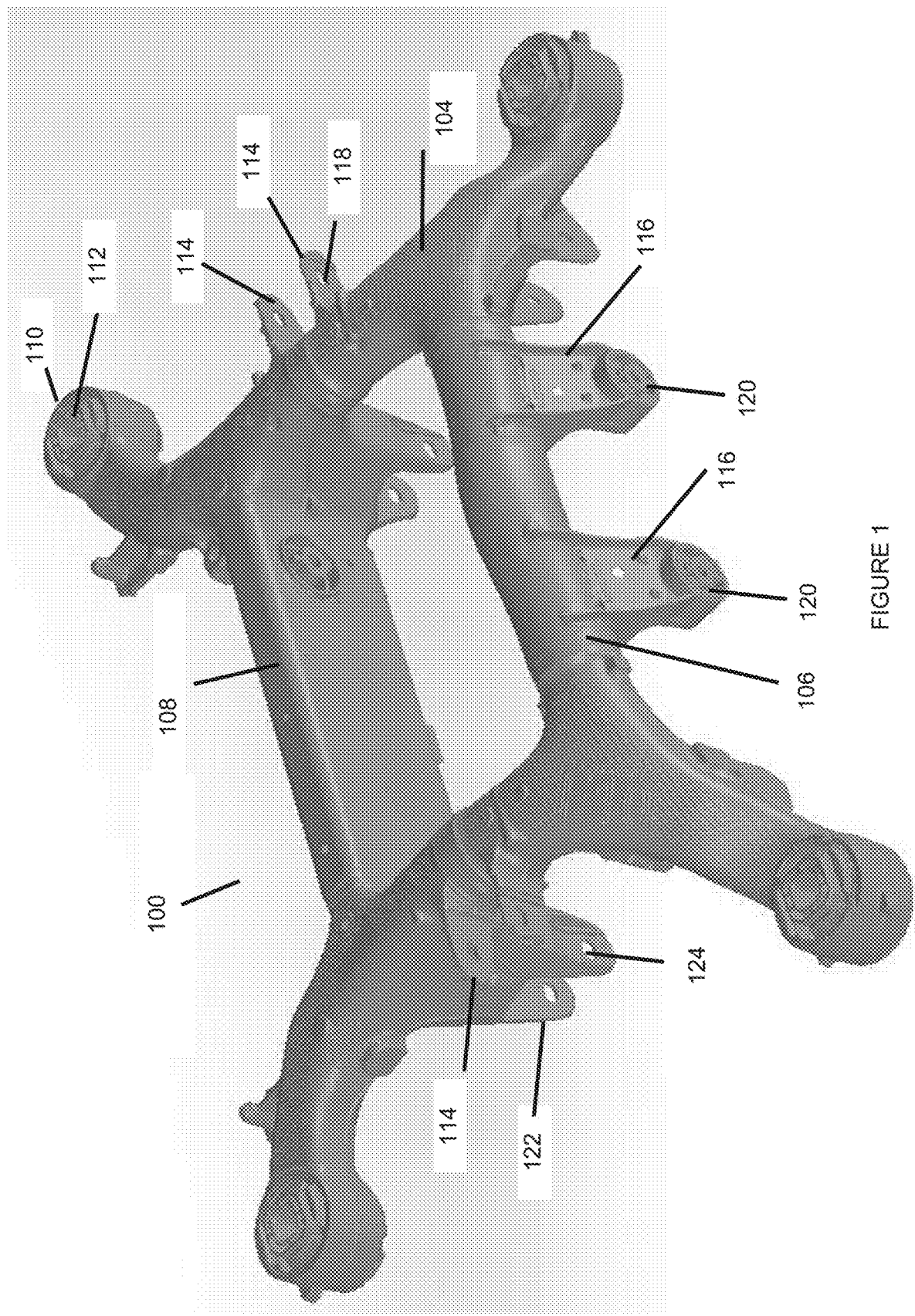
FIG. 1 illustrates a perspective view of a typical automotive subframe.

FIG. 1 shows a typical subframe for one type of automobile. It is important to note that vehicles may contain multiple subframes of different designs and functions, and each make and model of automobile may contain unique subframes to fit the needs of that specific automobile.

The typical automotive subframe 100 of FIG. 1 includes a left-side member 102, a right-side member 104, a rear cross member 106, and a front cross member 108, which are integrally connected by any known means in the art, such as welding.

The left-side member 102 and the right-side member 104 may have a generally U-shaped configuration. Each of the left-side member 102 and the right-side member 104 may include a pair of fixture points 110 configured to secure to accept, locate, and fix specific subassemblies in place to a main frame. This subframe 100 can be made from any type of material known in the art, including but not limited to steel, aluminum, and carbon fiber, with the goal of providing the fixture points 110 at critical dimensions such that the fit and function of a subassembly properly attached to the subframe interacts with the main frame and thus the rest of the automobile. Each fixture point 110 may contain apertures 112 configured to receive a locating pin, threaded bolt, or bushing.

The left and right-side members 102, 104 may further include one or more flanges 114 projecting outward and extending in the horizontal direction. The flanges 114 may further include apertures 118 located therein and configured to receive a locating pin, threaded bolt, or bushing. Additionally, the left and right-side members 102, 104 may further include one or more flanges 122 projecting downwardly and extending in a vertical direction, perpendicular to the left and right-side members 102, 104. The flanges 122 may further include apertures 124 located therein and configured to receive a locating pin, threaded bolt, or bushing.

Each of the rear cross member 106 and the front cross member 108 may include one or more flanges 116 projecting downward and extending in a vertical direction. The one or more flanges 116 may terminate in fixture points 120 for properly locating the subassembly.

Figure 2:
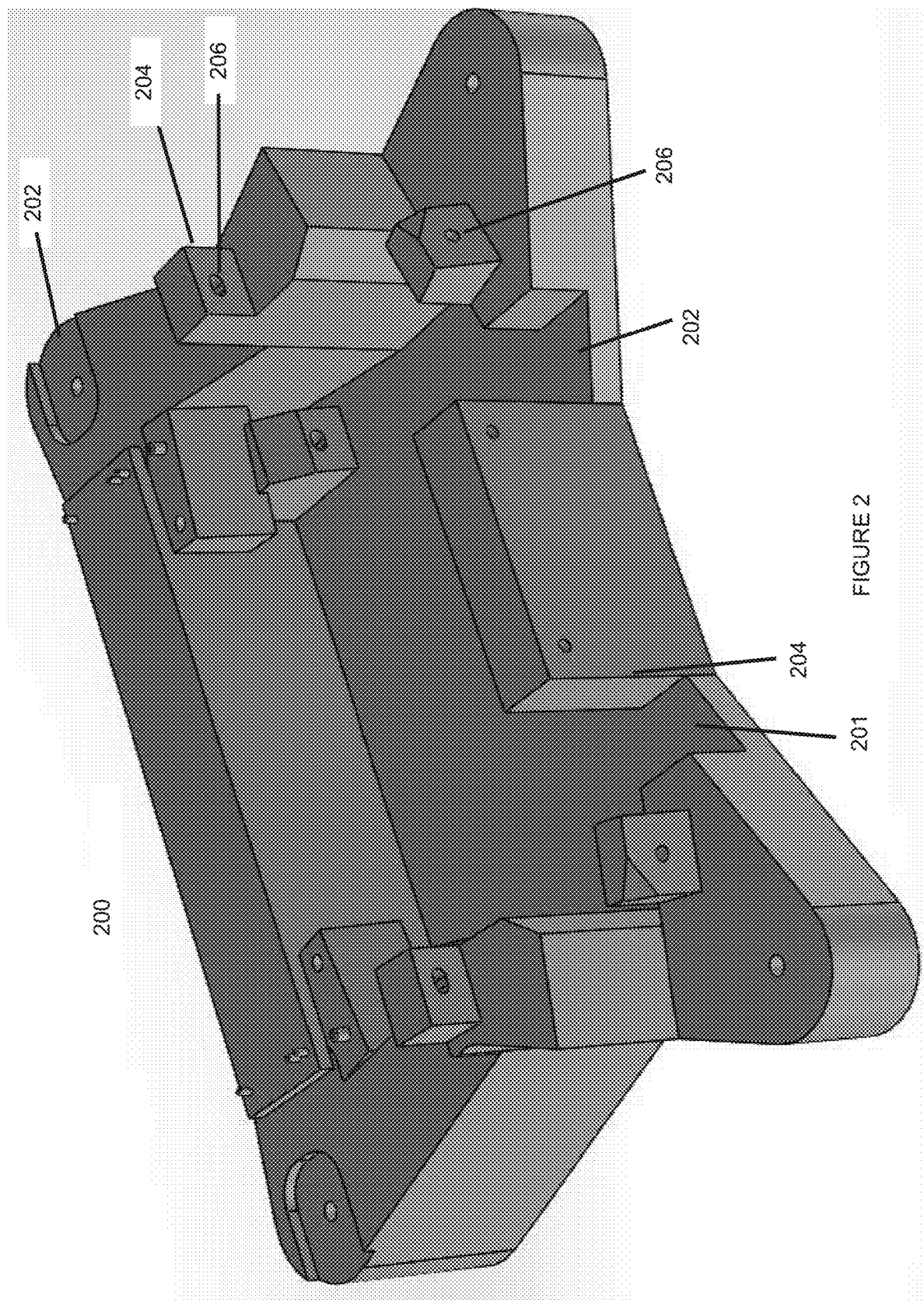
FIG. 2 illustrates a perspective view of a fixture in accordance with an aspect of the present invention.
Figure 3:
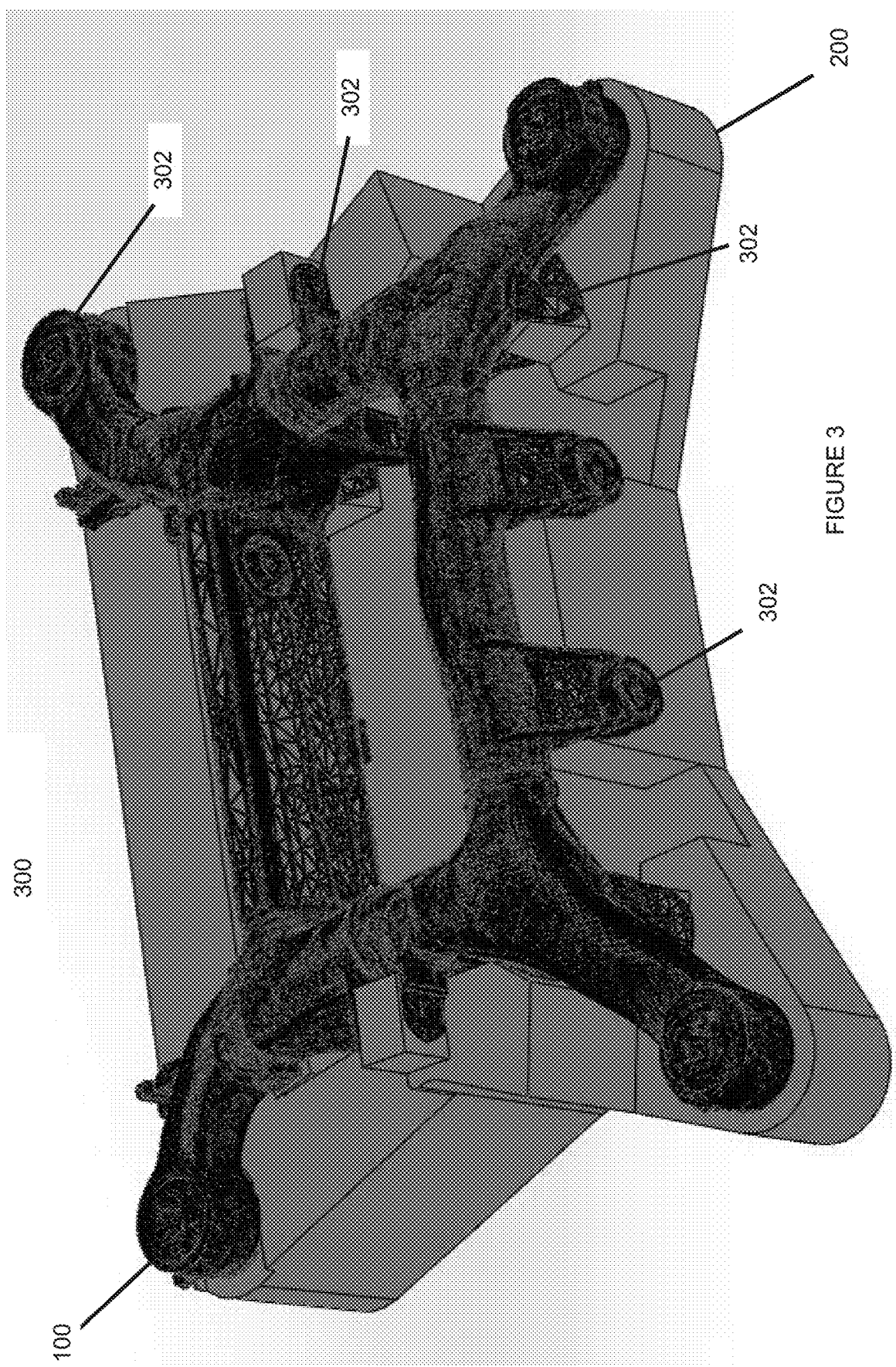
FIG. 3 illustrates the fixture of FIG. 2 engaged with the automotive subframe of FIG. 1, in accordance with an aspect of the present invention.

FIG. 2 shows a fixture 200 in accordance with an aspect of the present invention, specifically designed to match and mate with a subframe, such as the subframe 100 identified in FIG. 1. The fixture 200 may comprise a lower surface 201 having material voids 202 located within the lower surface 201 and columns 204 extending outwardly from the lower surface in order to closely fit the subframe 100 as seen in FIG. 3. That is, the lower surface, the columns and the material voids form the geometry of the fixture (i.e., the fixture geometry) and where matching the fixture geometry to a geometry of a subframe represents structural integrity of the subframe. Each material column 204 and void 202 of the fixture 200 is designed such that the subframe 100 can be lowered directly in place on top of the fixture 200. Thus, certain corners and angles on the columns 204 are cut to avoid interference.

The fixture 200 may further include apertures 206 which are strategically placed and angled within the lower surface 201, columns 204, and material voids 202 of the fixture 200 to align with apertures in the subframe 100 representing the subframe is structurally sound (this is has structural integrity). When the apertures 206 line up properly, a pin can be slid into the continuous aperture created between the fixture 200 and the subframe 100. When all pins can be slid into place, it can be safely indicated that the subframe being tested is correctly aligned to the fixture and thus is geometrically accurate for continued use. In other words, the subframe 100 is structurally sound as the apertures in the subframe and fixture line up properly. If all the pins cannot be slid into place, the subframe being inspected may have structural deficiencies. The fixture is unique to an individual subframe representing a specific automobile. That is, unique to a specific make and model of an automobile.

The design of the fixture 200 may be such that additive manufacturing processing, or 3D printing, may be employed. Thus, design features may exist to enhance this manufacturing process, including but not limited to, solid shell and infill voids.

Figure 4:
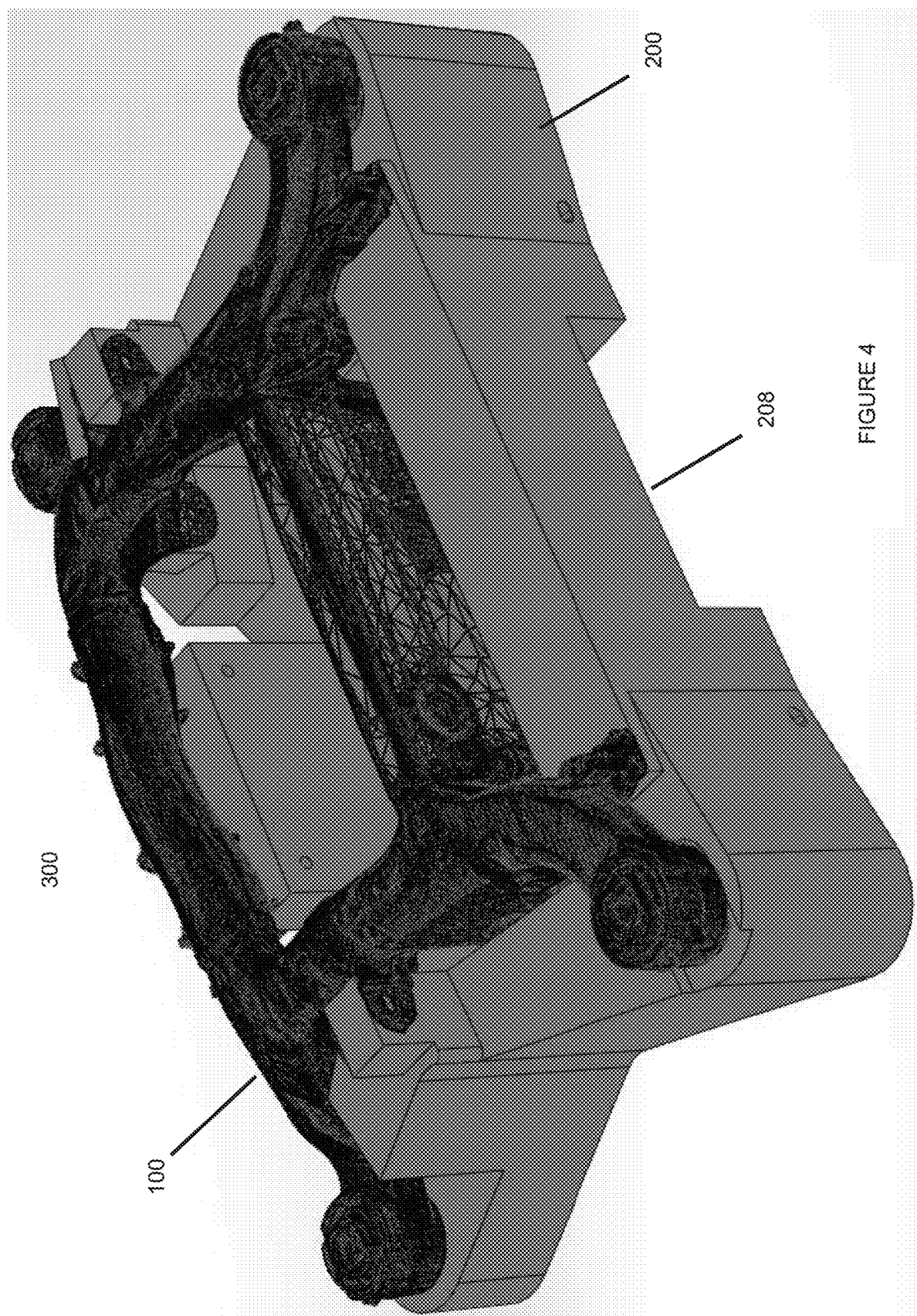
FIG. 4 illustrates a back view of the assembled fixture and subframe of FIG. 3.

Other voids may also exist within the fixture 200 in order to enhance the performance of the product. One such void 208 is shown in FIG. 4 where the back of the fixture 200 is visible. This void 208 may be designed to be a handle such that an operator can easily grab, slide, carry, and/or manipulate an unloaded fixture, such that the fixture can positioned to a working position to and from a storage position, such as a shelf.

Figure 5:
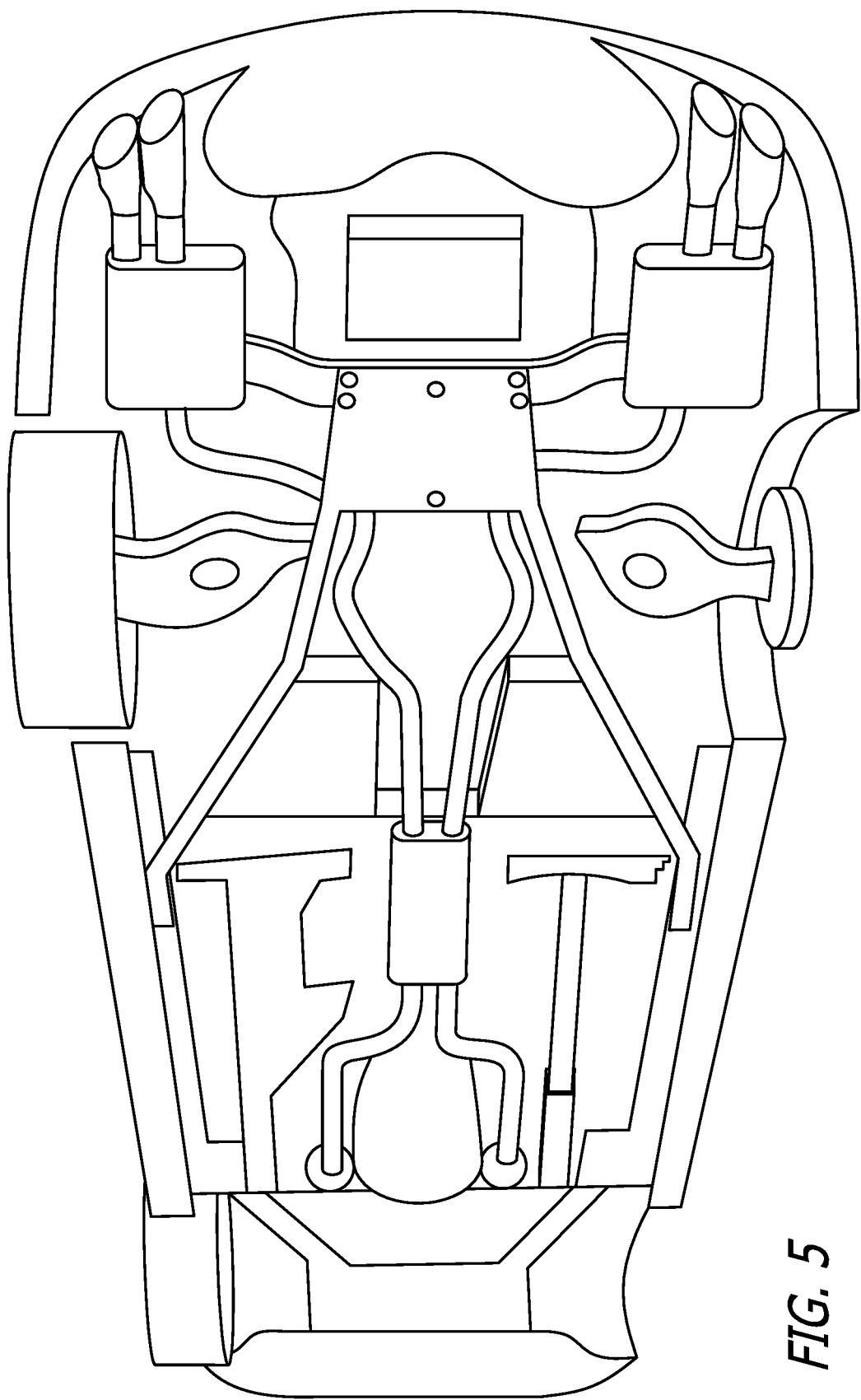
FIG. 5 illustrates a bottom view of an automobile showing subframes and suspension components.
Figure 6:
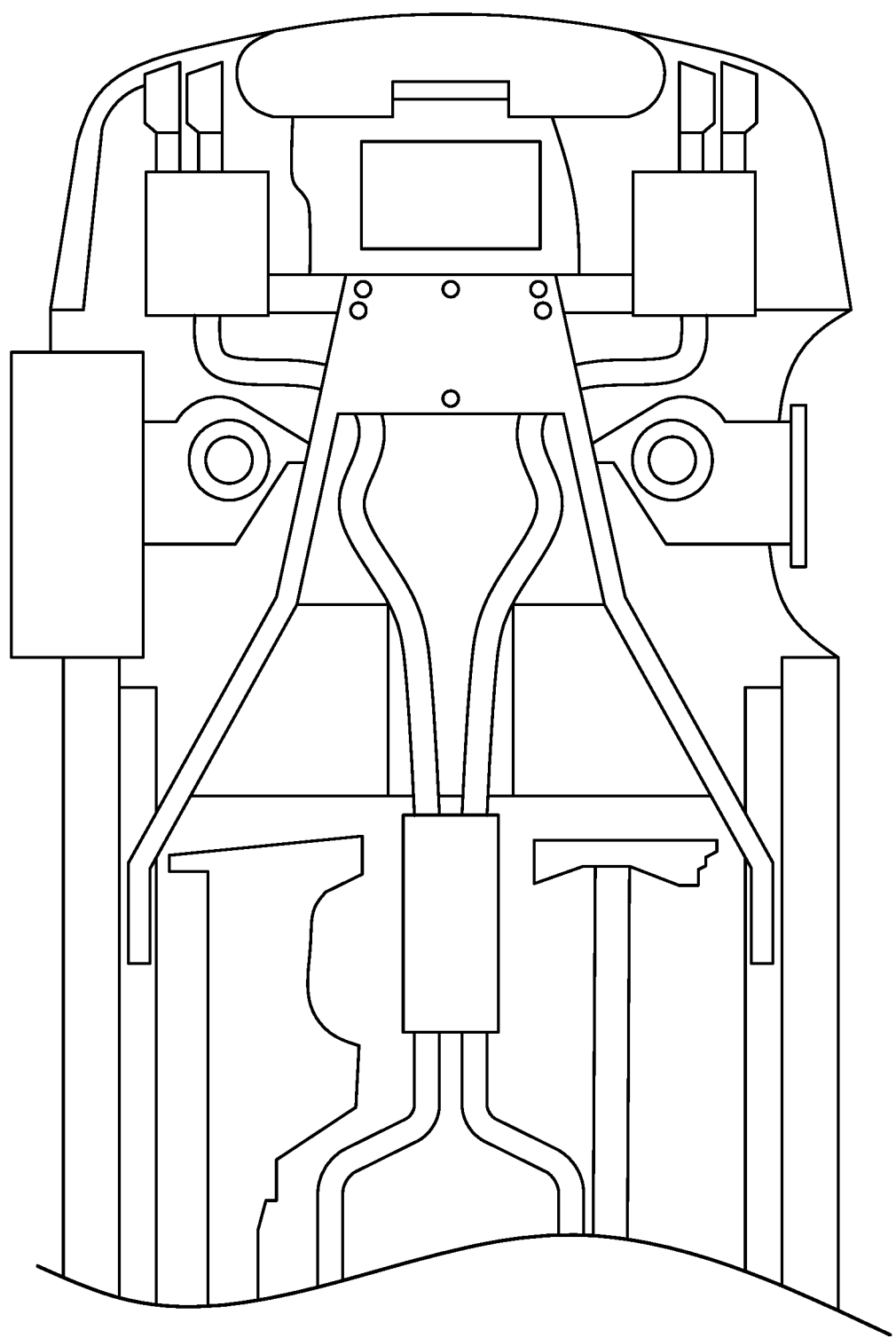
FIG. 6 illustrates a close-up view of the bottom of the automobile in FIG. 5.

FIG. 5 illustrates a bottom view of an automobile showing subframes and suspension components. FIG. 6 illustrates a close-up view of the bottom of the automobile in FIG. 5.

ALTERNATE EMBODIMENTS

The fixture may be designed to include an outer shell of one material, such as ABS plastic or carbon fiber, designed to fit over an internal frame structure made of strong rigid material such as metal. This may be a good way to keep the fixture both light weight, and rigid such that the fixture is always itself in alignment.

In another embodiment of this design, the internal frame structure defined above may alone act as the fixture. This may include a base with vertical protrusions or flanges where needed. These vertical protrusions may include the apertures defined above and may contact the subframe where needed to insure function of the fixture.

Figure 7:
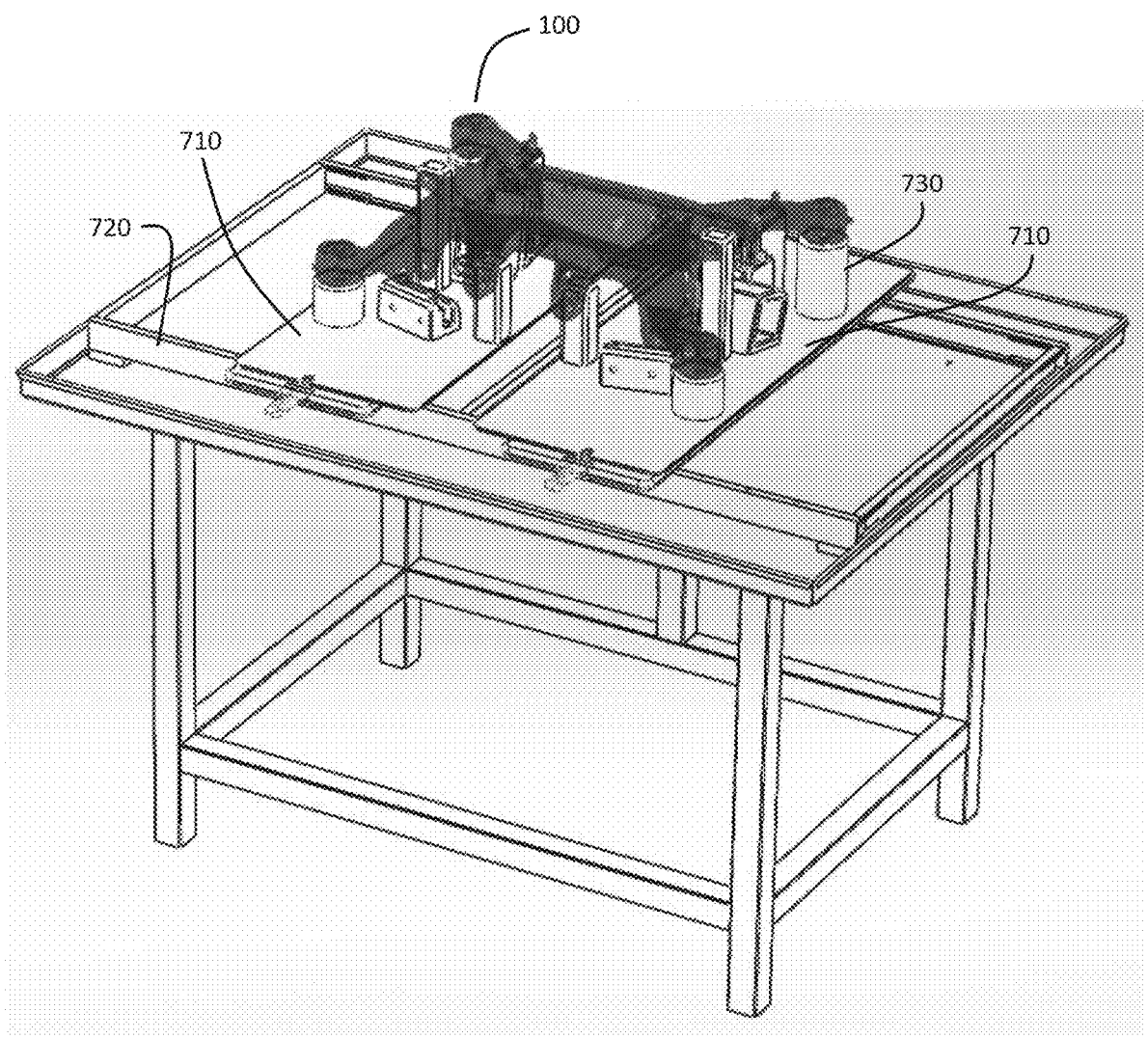
FIG. 7 illustrates a fixture which can be adjusted and reconfigured to fit individual subframes.

In still another embodiment of this design, the fixture may be designed such that it can be adjusted and reconfigured to fit individual subframes. As seen in FIG. 7, such a design would include a base 710 having connection points, such as a threaded hole pattern, which may be fixed in a position or mounted on a rail 720 with indexing positions to accommodate multiple sized subframe designs. The base connection points may accept risers and jigs 730 with the appropriate geometry and apertures, such that the fully assembled fixture would mate with the properly functioning subframe 100. That is, when the geometry of the subframe matches a geometry of the fixture and represents structural integrity of the subframe and when the geometry of the subframe matches a geometry of the fixture and represents lack of structural integrity of the subframe.

As seen in FIG. 7, multiple bases 710 with risers and jigs 730 may be utilized to form a fully assembled fixture. These multiple bases may include a mirrored left and right pattern, and/or be composed of two or more bases 710 as required. In this embodiment, these risers and jigs 730 may be unique to individual subframe designs. Multiple sets of risers and jigs could be assembled in turn on the base to accommodate multiple subframe designs. That is, the risers and jigs are used to adjust the fixture such that it will mate with a fixture that is structurally sound and/or aligned properly.

In all embodiments, the fixture may be incorporated with other components to make up an alignment system. Secondary system components may include a storage system for multiple fixtures, a working table with secure connection points for the fixture, and a hoist, either designed into the working table or as an individual component, used to lift, load, and unload subframes onto the fixture. This alignment system would allow for the most stable version of this fixture during the loading, alignment check, and unloading of the subframe. Thus, additional bolt holes for fixture points can be incorporated within the fixture to make this secure connection.

The word "exemplary" is used herein to mean "serving as an example, instance, or illustration." Any implementation or aspect described herein as "exemplary" is not necessarily to be construed as preferred or advantageous over other implementations or aspects described herein.

Likewise, the term "aspects" does not require that all aspects of the disclosure include the discussed feature, advantage, or mode of operation.

The term "coupled" is used herein to refer to the direct or indirect coupling between two objects. For example, if object A physically touches object B and object B touches object C, then objects A and C may still be considered coupled to one another-even if they do not directly physically touch each other.

While the foregoing disclosure shows illustrative embodiments, it should be noted that various changes and modifications could be made herein without departing from the scope of the disclosure as defined by the appended claims. The functions, steps and/or actions of the method claims in accordance with the embodiments described herein need not be performed in any particular order. Furthermore, although elements of embodiments may be described or claimed in the singular, the plural is contemplated unless limitation to the singular is explicitly stated.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Although the present subject matter and its advantages have been described in detail, it should be understood that various changes, substitutions and alterations can be made herein without departing from the spirit and scope of this disclosure as defined by the appended claims. Moreover, the scope of the present disclosure is not intended to be limited to the particular aspects of the process, machine, manufacture, composition of matter, means, methods and steps described herein. As one of ordinary skill in the art will readily appreciate from this disclosure of the present subject matter, processes, machines, manufacture, compositions of matter, means, methods, or steps, presently existing or later to be developed that perform substantially the same function or achieve substantially the same result as the corresponding features described herein may be utilized according to the present disclosure. Accordingly, the appended claims are intended to include within their scope such processes, machines, manufacture, compositions of matter, means, methods, or steps.

The invention claimed is:

1. An automobile subframe alignment fixture for inspecting a subframe, comprising:
   a lower surface;
   one or more columns extending outwardly from the lower surface; and
   one or more material voids located within the lower surface;
   where the lower surface, the one or more columns and the one or more material voids form a fixture geometry; and
   where matching the fixture geometry to a geometry of a subframe represents structural integrity of the subframe.

2. The fixture of claim 1, further comprising:
   one or more apertures located within the lower surface, the one or more columns, and/or the one or more material voids;
   where when the one or more apertures directly line up with subframe apertures on the subframe, a continuous aperture is formed between the fixture and the subframe representing structural integrity of the subframe.

3. The fixture of claim 1, wherein a pin passing through the one or more apertures in the fixture and the one or more apertures in the subframe represents that fixture is properly aligned with the subframe.

4. The fixture of claim 1, wherein angles are formed into the one or more columns allowing the subframe to be lowered onto the fixture and avoid interference.

5. The fixture of claim 1, wherein the fixture is unique to an individual subframe representing a specific automobile.

* * * * *